US006978285B2

(12) United States Patent
Li (10) Patent No.: US 6,978,285 B2
(45) Date of Patent: Dec. 20, 2005

(54) METHODS AND APPARATUS FOR CONCURRENT ENUMERATION OF AN OBJECT REFERENCE ROOT SET

(75) Inventor: Xiaofeng Li, Beijing (CN)

(73) Assignee: Intel Corporation, Santa Clara, CA (US)

(*) Notice: Subject to any disclaimer, the term of this patent is extended or adjusted under 35 U.S.C. 154(b) by 508 days.

(21) Appl. No.: 10/225,976

(22) Filed: Aug. 22, 2002

(65) Prior Publication Data

US 2004/0039758 A1 Feb. 26, 2004

(51) Int. Cl.⁷ ............................................. G06F 17/30
(52) U.S. Cl. .................................................. 707/206
(58) Field of Search ....................... 707/206; 711/159

(56) References Cited

U.S. PATENT DOCUMENTS

| 5,819,299 A | * | 10/1998 | Bejar | 707/206 |
|---|---|---|---|---|
| 6,093,216 A | * | 7/2000 | Adl-Tabatabai et al. | 717/128 |
| 6,289,360 B1 | * | 9/2001 | Kolodner et al. | 707/206 |
| 6,502,111 B1 | * | 12/2002 | Dussud | 707/206 |
| 6,826,583 B1 | * | 11/2004 | Flood et al. | 707/206 |

OTHER PUBLICATIONS

Doligez et al., Portable, Unobtrusive Garbage Collection for Multiprocessor Systems, Jan. 1994, Conference Record of the Twenty First Annual ACM Syposium on Principles of Programing Languages POPL -94, pp. 70-83.*
J. Gosling et al. The Java Language Specification. *Section 12.6*, as printed on Aug. 5, 2003. 1999.
ECMA. C# Language Specification, Draft 01. pp. 13-15, Oct. 2000.
T. Lindholm et al. The Java Virtual Machine Specification, Second Edition. pp. 67-71, 1999.
ECMA. Standard ECMA—335 Common Language Infrastructure, Partition I, Second Edition, Chapter 6. Dec. 2002. pp 21-23.
Intel Open Runtime Platform (ORP), http://orp.sourceforge.net/. As printed on Aug. 18, 2003.
"Object Oriented Programming." http://searchwin2000.techtarget.com/sDefinition/0,,sid1_gci212681,00.html, as printed on Jun. 6, 2003.
"Operating System." http://searchwin2000.techtarget.com/sDefinition/0,,sid1_gci212714,00.html, as printed on Jul. 8, 2002.
"Method." http://whatis.techtarget.com/definition/0,,sid9_gci212559,00.html, as printed on Jul. 8, 2002.
"Instruction." http://whatis.techtarget.com/definition/0,,sid9_gci212356,00.html, as printed on Jul. 8, 2002.

(Continued)

*Primary Examiner*—Jack M. Choules
(74) *Attorney, Agent, or Firm*—Hanley, Flight & Zimmerman, LLC (57) ABSTRACT

Methods and apparatus for performing a concurrent garbage collection process are disclosed. Preferably, upon detecting that less than a predetermined amount of memory is available, a garbage collector instructs each operating thread to self-enumerate to identify its associated live object reference root set, to report the live object reference root set, and to subsequently suspend operation. Based on the reported live object reference root sets, stale memory is identified and released for future use by operating threads. The threads are then instructed to resume operation.

23 Claims, 4 Drawing Sheets

OTHER PUBLICATIONS

"Data." http://searchstorage.techtarget.com/sDefinition/0,,sid5_gci211894,00.html, as printed on Jul. 9, 2002.
"Class." http://searchvb.techtarget.com/sDefinition/0,,sid8_gci211790,00.html, as printed on Jul. 9, 2002.
"Data Modeling." http://searchdatabase.techtarget.com/sDefinition/0,,sid13_gci11902,00.html, as printed on Jul. 9, 2002.
"Thread-safe." http://whatis.techtarget.com/definition/0,,sid9_gci331590,00.html, as printed on Jul. 8, 2002.
"Microprocessor." http://searchhp.techtarget.com/sDefinition/0,,sid6_gci212568,00.html, as printed on Jul. 8, 2002.
"Processor." http://whatis.techtarget.com/definition/0,,sid9_gci212833,00.html, as printed on Jul. 8, 2002.
"Bytecode." http://whatis.techtarget.com/definition/0,,sid9_gci211722,00.html, as printed on Jul. 8, 2002.
"Garbage." http://whatis.techtarget.com/definition/0,,sid9_gci212175,00.html, as printed on Jul. 8, 2002.
"Virtual Machine." http://whatis.techtarget.com/definition/0,,sid9_gci213305,00.html, as printed on Jun. 6, 2003.
"Just-In-Time Compiler." http://whatis.techtarget.com/definition/0,,sid9_gci212423,00.html, as printed on Jun. 6, 2003.
"Memory." http://searchsystemsmanagement.techtarget.com/sDefinition/0,,sid20_gci212546,00.html, as printed on Jul. 8, 2002.
"Java." http://searchsolaris.techtarget.com/sDefinition/0,,sid12_gci212415,00.html, as printed on Jul. 8, 2002.
Sun Microsystems. "New To Java Programming—Unraveling Terms." http://developer.java.sun.com/developer/onlineTraining/new2java/programming/learn/unravelingjava.html, as printed on Jul. 8, 2002.
Sun Microsystems. "JAVA JIT Compiler Overview." http://wwws.sun.com/software/solaris/jit/, as printed on Jul. 8, 2002.

* cited by examiner

METHODS AND APPARATUS FOR CONCURRENT ENUMERATION OF AN OBJECT REFERENCE ROOT SET

TECHNICAL FIELD

The present disclosure relates in general to compilers, and, in particular, to methods and apparatus for concurrent enumeration of an object reference root set.

BACKGROUND

Microprocessors are required to perform memory management to optimize finite, available memory resources. Memory management includes implementing specialized memory management tasks designed to identify and release memory associated with stale or dead objects. The memory associated with a dead object may have been previously allocated to the object for the purpose of executing a task whose execution has been completed or is no longer required. Memory associated with dead objects is referred to herein as "garbage or stale memory," and a process of identifying and releasing the garbage memory back into a main memory, or memory heap, may be referred to herein as a "garbage collection process."

When releasing the garbage memory back into the memory heap during a prior art garbage collection process, all task execution other than the garbage collection process must be suspended. Suspension of all task execution is required to prevent the occurrence of a race condition (i.e., a condition that may occur when both an executing task and the garbage collection process attempt to access the same piece of memory, thereby causing the executing task to crash). Of course, when task execution is suspended, the processor(s) executing the suspended tasks are idle and, therefore, not operating at their optimum level, thereby resulting in wasted computer resources and overall inefficiency of computer resources.

DETAILED DESCRIPTION OF THE PREFERRED EXAMPLES

Figure 1:
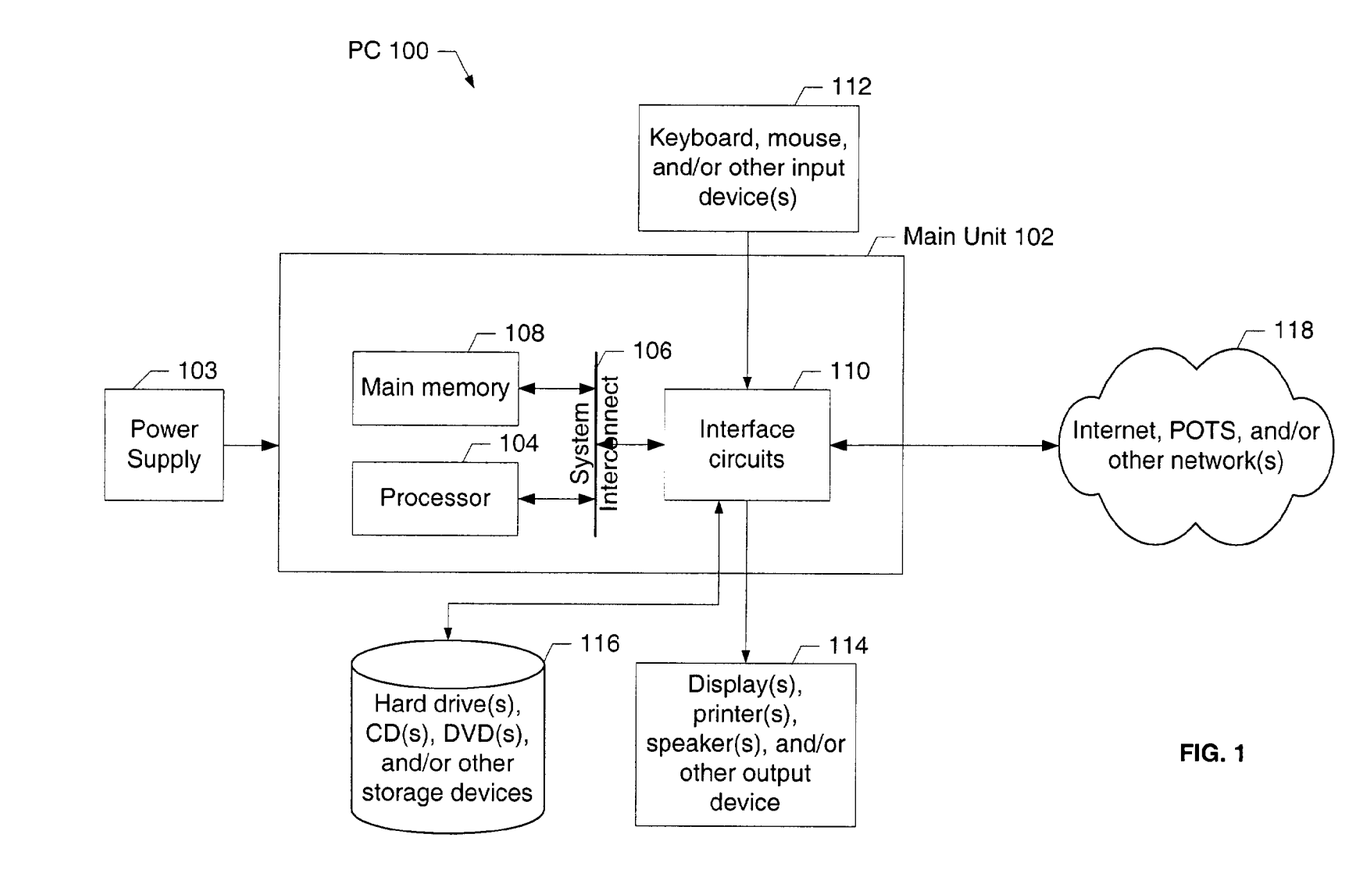
FIG. 1 is a block diagram of an example computer system.

A block diagram of an example computer system 100 is illustrated in FIG. 1. The computer system 100 may be a personal computer (PC), a personal digital assistant (PDA), an Internet appliance, a portable radio telephone, a server, or any other computing device. In the illustrated example, the computer system 100 includes a main processing unit 102 powered by a power supply 103. The main processing unit 102 includes one or more processor(s) 104 electrically coupled by a system interconnect 106 to one or more memory device(s) 108, and one or more interface circuits 110 electrically coupled to the processor(s) 104 via the system interconnect 106. In the illustrated example, the system interconnect 106 is an address/data bus. Of course, a person of ordinary skill in the art will readily appreciate that interconnects other than busses may be used to connect the processor(s) 104 to the memory device(s) 108. For example, one or more dedicated lines and/or a crossbar may be used to connect the processor(s) 104 to the memory device(s) 108.

The processor(s) 104 may include any type of microprocessor, such as a microprocessor from the Intel Pentium™ family of microprocessors, the Intel Itanium™ family of microprocessors, and/or the Intel XScale™ family of processors. The main memory device 108 includes random access memory such as dynamic random access memory (DRAM), and also includes non-volatile memory (e.g., flash memory). In the illustrated example, the memory device(s) 108 store a software program which is executed by one or more of the procesor(s) 104 in a well known manner.

The interface circuit(s) 110 may be implemented using any type of well known interface standard, such as an Ethernet interface and/or a Universal Serial Bus (USB) interface. One or more input devices 112 are connected to the interface circuits 110 for entering data and commands into the main processing unit 102. For example, the input devices 112 may be a keyboard, mouse, touch screen, track pad, track ball, isopoint, and/or a voice recognition system.

One or more displays, printers, speakers, and/or other output devices 114 are also connected to the main processing unit 102 via one or more of the interface circuits 110. The display 114 may be a cathode ray tube (CRTs), a liquid crystal display (LCDs), or any other type of display. The display 114 generates visual indications of data generated during operation of the main processing unit 102. The visual displays may include prompts for human operator input, calculated values, detected data, etc.

The computer system 100 also includes one or more storage devices 116. For example, the computer system 100 may include one or more hard drives, a compact disk (CD) drive, a digital versatile disk drive (DVD), and/or other computer media input/output (I/O) devices.

The computer system 100 also exchanges data with other devices via a connection to a network 118. The network connection may be any type of network connection, such as an Ethernet connection, digital subscriber line (DSL), telephone line, coaxial cable, etc. The network 118 may be any type of network, such as the Internet, a telephone network, a cable network, and/or a wireless network.

Figure 2:
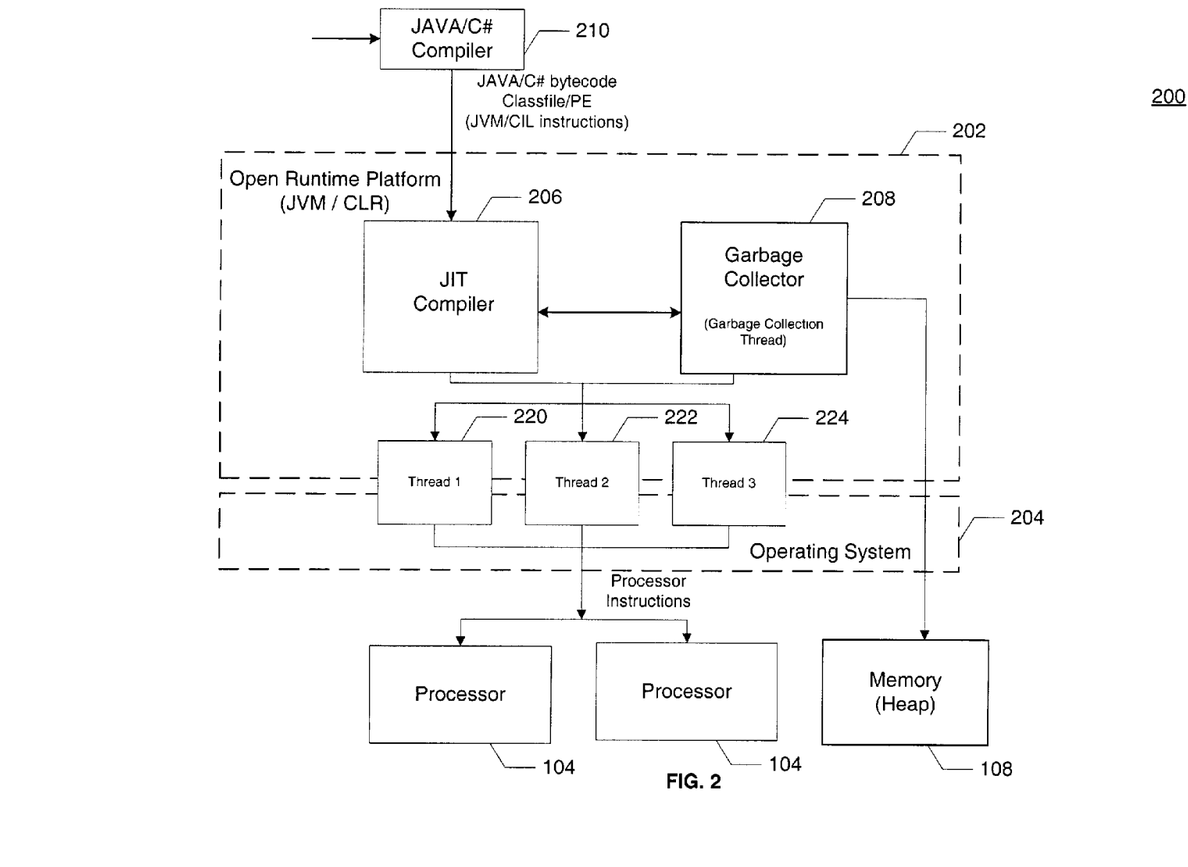
FIG. 2 is a block diagram illustrating an example implementation of a runtime system operating in the computer system of FIG. 1.

A block diagram of an example runtime system 200 operating in the computer system 100 is illustrated in FIG. 2. The runtime system 200 is hardware and operating system independent and may therefore be embedded in various products such as web browsers, servers, etc. As illustrated in FIG. 2, the example runtime system 200 includes a Virtual Machine (VM) 202 (i.e., a software program that converts bytecode, or platform independent code, into specific processor instructions), and an operating system program (OS) 204 (i.e., a software program such as Windows XP™ that manages other application programs in the computer system 100). Implementation of the VM 202 may be achieved in any number of ways, for example, by an Open Runtime Platform™ (ORP) available from Intel.

In the case of an ORP implementation, the VM 202 preferably includes, inter alia, an optional Just-In-Time compiler (JIT compiler) 206 for dynamically compiling the bytecode into processor-specific executable code (as an alternative to interpreting one bytecode instruction at a time). The VM 202 also preferably includes a Garbage Collector (GC) 208 operatively coupled to the memory 108 for allocating memory required for execution of various tasks such as JAVA thread execution (discussed below). As will be appreciated by those of ordinary skill in the art, the JIT compiler 206, the GC 208 and the OS 204 are typically software programs in the form of processor instructions running on a processor such as processor 104.

The VM 202 may be configured in any number of ways to translate class files into processor instructions. For example, the VM 202 may be configured as a JAVA virtual machine (JVM) for compiling JAVA bytecode class files (previously compiled from JAVA source code) into instructions suitable for use by the processor(s) 104. The VM 202 may also be configured as a common language runtime (CLR) platform for compiling C# bytecode portable executable (PE) files into instructions suitable for processor(s) 104.

As is known, virtual machine operation requires bytecode input. Thus, application source code is first compiled into bytecode prior to re-compilation into processor executable instructions. Thus, for JAVA applications such as SPECjvm98 or SPECjbb2000, the JAVA source code is first compiled into JAVA bytecode (i.e., classfiles) by a JAVA compiler 210. Then, upon request by a user (e.g., the runtime platform 202), the JAVA bytecode, or JAVA virtual machine instructions, are compiled by the JIT compiler 206 into processor instructions (i.e., machine code for the particular processor 104) using memory locations supplied by the garbage collector 208. Utilization of the optional JIT compiler 206 therefore allows the process of dynamically generating the processor instructions to be fairly efficient.

The processor instructions, herein referred to as "threads" are a sequence of computing instructions that make up an execution unit. Thus, a thread execution is an instance of a program running on behalf of a user or process. For example, a thread may be a JAVA thread created by the VM 202 as an instance of a corresponding JAVA application program, or it may even be a garbage collection thread executing in a JAVA virtual machine, for example, the VM 202. Scheduling of the threads for execution by the processor(s) 104 is performed by the operating system 204. Thus, in an active runtime system such as runtime system 200, there may be any number of JAVA threads executing at any particular time.

As is known, threads such as JAVA threads are implemented by, and operate with, "objects" (i.e., software logical entities that represent the basic building blocks of the program). Each object has associated methods to provide computer instructions and class object characteristics to provide relevant data during execution of the object. A first method in one object may call-up a second method in the same or a different object, which may call-up a third method, and so on. Such a chain of calling-up methods provides the basis of thread execution.

A multi-threaded process can have multiple threads with each thread executing independently and each executing on separate processors 104 (if multiple processors 104 are available) of the computer system 100. For example, in a GUI-based (Graphic User Interface based) network application such as a Web browser, a user could be listening to an audio clip while scrolling a page, and in the background the browser could be downloading an image. Of course, a multi-threaded program, if running in parallel on a computer system 100 with multiple processors 104, will run much faster than a single-threaded program running on a single processor.

As was briefly discussed above, the JIT compiler 206 translates bytecode into processor instructions, which upon execution are organized into threads. Creation of the threads as well as creation of new objects requires the use of memory locations. Thus, upon a request from a JAVA thread such as any of threads 220, 222, 224, the garbage collector 208 acquires memory from the memory heap 108 for use in creating a new object. Thus, each object in a thread, executing or otherwise, is associated with a particular memory location.

Although JAVA threads such as threads 220, 222, 224, acquire memory for creation of a new object, they do not release the used memory to the memory heap 108 upon termination of object usage. Accordingly, the finite available memory of the memory heap 108 is eventually consumed by operation of the threads 220, 222, 224, etc. The garbage collector (GC) 208 is therefore tasked to execute a garbage collection process to identify and free memory associated with useless or dead objects (i.e., all objects with no more object references to them).

In the prior art, when the GC 208 determines that all available memory 108 has been exhausted, it first suspends execution of all running, or executing threads (except, obviously, the garbage collection process itself) to prevent the possible occurrence of a race condition (discussed above). After suspension of all running threads, the prior art GC 208 serially enumerates, or iterates through, each suspended JAVA thread in a sequential fashion to identify a root set of live object references for each suspended JAVA thread. The root set represents a set of references (i.e., variables, other objects, "cycles" of objects) to the live objects in their registers and runtime stacks. Such a process of enumerating a thread such as the thread 220 to determine its root set of live object references is referred to herein as "enumeration of an object reference root set" of that thread.

Next, using the root set of live object references, the GC 208 determines all of the live objects and their associated useful memory locations. By a process of elimination, the GC 208 is then able to determine the garbage memory (i.e., memory substantially unlikely to be required for subsequent thread execution). The garbage memory is then released (i.e., recycled) back to the memory heap 108, making it available for future object creation operations. Finally, the GC 208 initiates resumption of execution of all of the suspended threads Of course, during the time required for suspension of all running threads (to prevent possible race conditions) followed by sequential enumeration of all associated object reference root sets and subsequent identification and releasing of garbage memory, only one thread is active—the prior art garbage collector 208. Thus, only one processor 104 is utilized. Accordingly, the remaining processor(s) 104 are not operating at their optimum level, resulting in wasted computer resources and overall inefficiency of computer resources.

Figure 3:
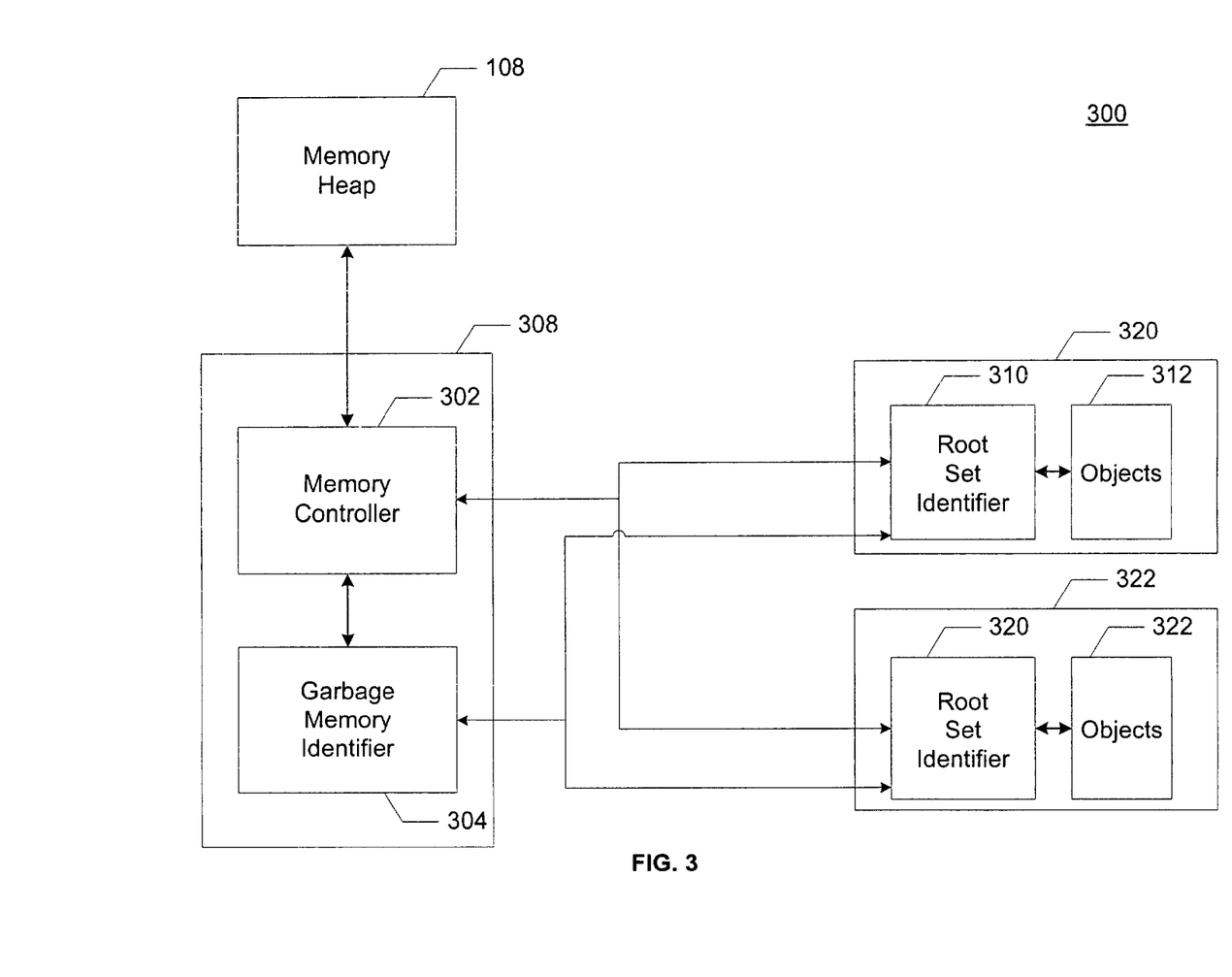
FIG. 3 is block diagram of an example apparatus constructed in accordance with the teachings of the invention.

An example concurrent garbage collection apparatus 300 which can be used in place of the garbage collector 208 is illustrated in FIG. 3. In the illustrated example, the concurrent garbage collection apparatus 300 includes the memory heap 108, a garbage collector 308, and threads 320 and 322. The garbage collector 308 includes a memory controller 302 operatively coupled to a garbage memory identifier 304. Thread 320 includes a root set identifier 310 in communication with objects 312. Similarly, thread 322 includes a root set identifier 320 in communication with objects 322. The root set identifiers 310 and 320 are constructed to identify a root set of live object references associated with their objects 312 and 322, respectively. The memory controller 302 is operatively coupled to the memory heap 108 and the root set identifiers 310, 320, to control memory allocation. The garbage memory identifier 304 is operatively coupled to the root set identifiers 310 and 320.

In the illustrated example, the memory controller 302, the garbage memory identifier 304 and the root set identifier 310, 320 are implemented as software stored on a tangible medium such as a CD-ROM, a floppy disk, a hard drive, a digital versatile disk (DVD), or a memory, but persons of ordinary skill in the art will readily appreciate that one or more of the memory controller 302, the garbage memory identifier 304 and the root set identifiers 310, 320 could alternatively be implemented by hardware and/or firmware in a well known manner.

Figure 4:
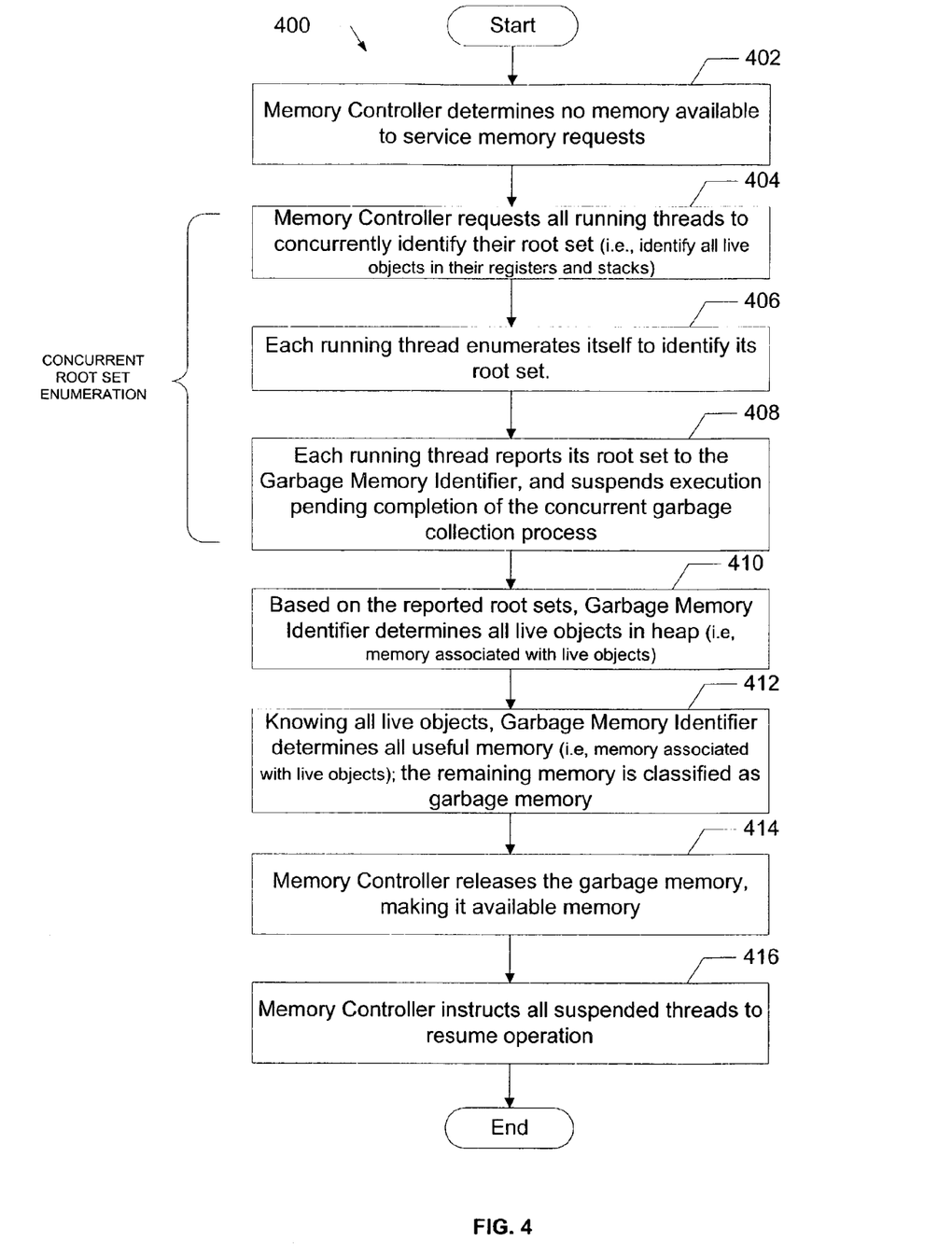
FIG. 4 is a flowchart illustrating an example program implementing the apparatus of FIG. 3.

FIG. 4 is a flowchart illustrating a software program to implement the apparatus of FIG. 3. The software program is stored on a tangible medium such as in the memory 108 and is referred to herein as a concurrent garbage collection process 400. The term "concurrent garbage collection process" as used herein refers to a garbage collection process employing concurrent root set enumeration. Although the example program is described with reference to the flowchart illustrated in FIG. 4, persons of ordinary skill in the art will readily appreciate that other methods of performing the concurrent garbage collection process 400 are contemplated. For example, the order of some of the blocks may be changed, and some of the blocks described may be optional. Implementation of the concurrent garbage process 400 may decrease processor 104 idle-time via concurrent enumeration of object reference root sets of running threads, and therefore, increase overall efficiency of computer resources during the garbage collection process.

Referring to FIG. 4, the concurrent garbage collection process 400 begins when the memory controller 302 of the garbage collector 308 determines that a threshold percentage of the memory 108 has been exhausted (block 402). The threshold percentage of the memory 108 may be any suitable percentage that permits efficient computer system 100 operation during the concurrent garbage collection process 302. After determining that the threshold amount of memory has been exhausted (e.g., no available memory exists), the memory controller 302 requests concurrently that each running thread (e.g., threads 320, 322) identify its root set of live object references (i.e., references to all live objects in their registers and stacks) (block 404). Enumeration of each running thread 320, 322 provides a live object reference root set, or set of useful object references of the thread, from which a set of live memory locations can be identified. Stale or garbage memory locations can then be inferred from the set of live memory locations.

This concurrent request may be accomplished using any number of suitable methods including setting a global flag accessible by all threads to initiate self-enumeration of their live object reference root sets. The concurrent request for self-enumeration of live object reference root sets may also be accomplished via a signal notification, or message from the GC 308 to the threads 320, 322.

Upon receipt of the request, the root set identifiers 310, 320 of each running thread 320, 322 enumerates its associated thread (block 406) to identify the thread's root set of live object references. The root set identifiers 310, 312 report the enumeration results back to the garbage memory identifier 304. In the illustrated example, each of the running threads 320, 322, enumerate themselves in parallel while continuing execution in their associated processor(s) 104 In other words, there is no processor idle time during concurrent self-enumeration. When concurrent self-enumeration is completed, the root set identifiers 310, 320 of the running threads 320, 322 individually report their root sets of live object references to the garbage memory identifier 304, and then suspend execution of the threads 310, 320 (block 408).

In this way, "self-enumeration" of running threads 320, 322 occurs concurrently (i.e., each thread enumerates its object reference roots set in parallel with all other running threads).

Next, using the root sets of the live object references received from the root set identifier 310, 320, the garbage memory identifier 304 determines the live objects (block 410) and their associated active, or useful memory locations (block 412). Based on an identity of the active memory locations, the garbage memory identifier 304 determines the stale or garbage memory (block 412). The garbage memory is then released by the memory controller 302, thereby making it available for future thread execution (block 414). The concurrent garbage collection process 400 is complete when the memory controller 302 instructs all suspended threads to resume operation (block 416). In this way, the processor(s) 104 are fully utilized during the concurrent root set enumeration period and are under utilized only for the short period of time in which garbage memory is identified and released back to the memory heap 108.

In summary, persons of ordinary skill in the art will readily appreciate that example methods and apparatus for identifying and releasing garbage memory back into a memory heap have been disclosed. The example methods and apparatus disclosed herein minimize thread suspension time, and therefore processor idle time associated with identifying and releasing the garbage memory back into the memory heap during the garbage collection process. Preferably, identifying the garbage memory is performed without suspending thread execution via the use of concurrent root set self-enumeration performed by the individual executing threads.

Although certain apparatus and methods have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. An apparatus for performing a garbage collection process on a memory heap having a plurality of memory locations, the plurality of memory locations comprising used memory locations and unused memory locations, the used memory locations comprising active memory locations and stale memory locations, the apparatus comprising:

a first thread including a first root set identifier to identify a first live object reference root set comprising references to objects created by the first thread in response to a request for live object reference root sets;

a second thread including a second root set identifier to identify a second live object reference root set comprising references to objects created by the second thread in response to the request; and a garbage collector to monitor the plurality of memory locations, to generate the request for live object reference root sets, and to determine a plurality of stale memory locations based on the first and second live object reference root sets.

2. An apparatus as defined in claim 1 wherein the garbage collector includes:

a memory controller to monitor the plurality of memory locations and to generate the request for live object reference root sets; and a garbage memory identifier to determine the plurality of stale memory locations.

3. An apparatus as defined in claim 2 wherein the garbage memory identifier instructs the first thread to suspend operation after the first live object reference root set is reported to the garbage memory identifier and instructs the second thread to suspend execution after the second live object reference root set is reported to the garbage memory identifier.

4. An apparatus as defined in claim 2 wherein the garbage memory identifier determines the plurality of stale memory locations by eliminating active memory locations associated with the first and second set of live object reference root sets from a set of used memory locations.

5. An apparatus as defined in claim 3 wherein the memory controller releases the plurality of stale memory locations to the memory heap and instructs the first and second threads to resume operation.

6. A tangible medium storing computer readable software comprising:
   first software to monitor a memory heap to determine if the heap has less than a predetermined amount of available memory;
   second software to identify a first live object reference root set, the first live object reference root set comprising references to objects created by the second software;
   third software to identify a second live object reference root set, the second live object reference root set comprising references to objects created by the third software, the second and third software operating substantially concurrently; and
   fourth software to identify a plurality of stale memory locations in the memory heap based on the first and second live object reference root sets.

7. A tangible medium storing computer readable software as defined in claim 6 further comprising fifth software to report the first and second live object reference root sets.

8. A tangible medium storing computer readable software as defined in claim 7 further comprising sixth software to suspend operation of the first and second thread after the first and second live object reference root sets have been reported.

9. A tangible medium storing computer readable software as defined in claim 8 further comprising seventh software to release the plurality of stale memory locations to the memory heap.

10. A tangible medium storing computer readable software as defined in claim 9 further comprising eighth software to instruct the first and second threads to resume operation after the plurality of stale memory locations have been released to the memory heap.

11. A tangible medium storing computer readable software as defined in claim 6 wherein the fourth software determines the plurality of stale memory locations in the memory heap by eliminating active memory locations associated with the first and second set of live object reference root sets from a set of used memory locations of the memory heap.

12. A garbage collector for performing a concurrent garbage collection process on a memory heap for a plurality of executing threads, the memory heap having a plurality of memory locations, the plurality of memory locations comprising used memory locations and unused memory locations, the used memory locations comprising active memory locations and stale memory locations, the garbage collector comprising:
   a memory controller to monitor the plurality of memory locations and upon detecting that less than a predetermined amount of unused memory is available, to generate a request for enumeration of a live object reference root set by each of the plurality of executing threads, wherein the live object reference root set comprises references to objects created by the plurality of executing threads; and
   a garbage memory identifier responsive to receipt of the live object reference root sets from each of the executing threads to suspend execution of each of the executing threads and to identify a plurality of stale memory locations based on the plurality of live object reference root sets.

13. A garbage collector as defined in claim 12 wherein the garbage memory identifier determines the plurality of stale memory locations by eliminating active memory locations associated with the plurality of live object reference root sets from a set of memory locations.

14. A garbage collector as defined in claim 12 wherein the memory controller releases the plurality of stale memory locations to the memory heap and instructs the plurality of threads to resume execution.

15. A computer comprising:
   a memory heap comprising a plurality of memory locations including used memory locations and unused memory locations, the used memory locations including active memory locations and stale memory locations;
   a just in time compiler configured to compile a plurality of class files into a plurality of threads upon demand, the compilation and thread execution of the plurality of threads requiring at least one unused memory location; and
   a garbage collector operatively coupled to the just in time compiler and the memory heap, the garbage collector configured to select the at least one unused memory location in response to a request for memory if there are unused memory locations available, and the garbage collector configured to initiate a concurrent garbage collection process if there are less than a predetermined amount of unused memory locations available, the concurrent garbage collection process comprising a concurrent root set self-enumeration by the plurality of threads executing during a time when the plurality of threads are executing on the computer.

16. A computer as defined in claim 15 wherein the garbage collector concurrently requests each of the plurality of threads to identify a root set of live object references upon initiation of the concurrent garbage collection process.

17. A computer as defined in claim 16 wherein the root set of live object references provides data to identify a plurality of stale memory locations suitable for recycling into a plurality of unused memory locations.

18. A method for performing a garbage collection process on a memory heap having a plurality of memory locations, the plurality of memory locations comprising used memory locations and unused memory locations, the used memory locations comprising active memory locations and stale memory locations, the method comprising:
   monitoring the plurality of memory locations;
   generating a request for live object reference root sets if the memory heap has less than a predetermined amount of unused memory locations;
   identifying a first live object reference root set comprising references to objects created by a first thread in response to the request, wherein the identification is performed by a root set identifier of the first thread;
   identifying a second live object reference root set comprising references to objects created by a second thread in response to the request, wherein the identification is performed by a root set identifier of the second thread; and identifying a plurality of stale memory locations in the memory heap based on the first and second live object reference root sets.

19. A method for performing a garbage collection process on a memory heap as defined in claim 18 further comprising:
reporting the first live object reference root set;
reporting the second live object reference root set;
instructing the first thread to suspend operation after the first live object reference root set is reported; and
instructing the second thread to suspend operation after the second live object reference root set is reported.

20. A method for performing a garbage collection process on a memory heap as defined in claim 19 further comprising:
releasing the plurality of stale memory locations to the memory heap; and
instructing the first and second threads to resume operation.

21. A method for performing a garbage collection process on a memory heap as defined in claim 18 wherein identifying the plurality of stale memory locations results from eliminating active memory locations associated with the first and second set of live object reference root sets from a set of used memory locations.

22. A method for performing a garbage collection process on a memory heap as defined in claim 18 wherein identifying the first live object reference root set and identifying the second live object reference root set occur at substantially the same time.

23. A method for performing a garbage collection process on a memory heap as defined in claim 18 wherein identifying the first live object reference root set and identifying the second live object reference root set occur while the first and second threads are executing.

* * * * *